US008201253B1

(12) United States Patent
Yan et al.

(10) Patent No.: US 8,201,253 B1
(45) Date of Patent: Jun. 12, 2012

(54) PERFORMING SECURITY FUNCTIONS WHEN A PROCESS IS CREATED

(75) Inventors: Lee Guang Yan, Bellevue, WA (US); Alexey A. Polyakov, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1400 days.

(21) Appl. No.: 11/183,318

(22) Filed: Jul. 15, 2005

(51) Int. Cl.
*H04L 29/06* (2006.01)

(52) U.S. Cl. ............................. 726/24; 713/187; 713/188

(58) Field of Classification Search ....................... None
See application file for complete search history.

(56) References Cited

U.S. PATENT DOCUMENTS

| | | | | |
|---|---|---|---|---|
| 7,552,479 | B1 * | 6/2009 | Conover et al. | 726/24 |
| 7,716,741 | B2 * | 5/2010 | Forman et al. | 726/24 |
| 2002/0129264 | A1 * | 9/2002 | Rowland et al. | 713/200 |
| 2003/0018906 | A1 * | 1/2003 | Smith et al. | 713/189 |
| 2003/0188189 | A1 * | 10/2003 | Desai et al. | 713/201 |
| 2004/0049693 | A1 * | 3/2004 | Douglas | 713/200 |
| 2004/0225877 | A1 * | 11/2004 | Huang | 713/100 |
| 2005/0091558 | A1 * | 4/2005 | Chess et al. | 714/38 |
| 2005/0193428 | A1 * | 9/2005 | Ring et al. | 726/22 |
| 2005/0204205 | A1 * | 9/2005 | Ring et al. | 714/47 |
| 2005/0216770 | A1 * | 9/2005 | Rowett et al. | 713/201 |
| 2005/0229250 | A1 * | 10/2005 | Ring et al. | 726/23 |
| 2006/0026683 | A1 * | 2/2006 | Lim | 726/23 |
| 2006/0031673 | A1 * | 2/2006 | Beck et al. | 713/164 |
| 2006/0156405 | A1 * | 7/2006 | Forman et al. | 726/24 |
| 2006/0179484 | A1 * | 8/2006 | Scrimsher et al. | 726/23 |
| 2009/0217377 | A1 * | 8/2009 | Arbaugh et al. | 726/23 |

OTHER PUBLICATIONS

"Intruders in UNIX systems. Detection, prevention and removal of rootkits," Dereszowski, CERT Polska, Oct. 12, 2004, http://signal11.eu/en/research/articles/secure2004_en.pdf.*
"Rootkit Detection on Windows Systems," Rutkowska, ITUnderground Conference, Oct. 12-13, 2004, http://www.bandwidthco.com/whitepapers/compforensics/malware/rk/Rootkits%20Detection%20Windows%20Systems.pdf.*
"API hooking revealed," Ivanov, Dec. 2, 2002, http://www.codeproject.com/KB/system/hooksys.aspx?display=Print.*
"Trojan Horse Programs and Rookies," NISCC Technical note 08/03, Issued Sep. 10, 2003.
Garfinkel, T. and Rosenblum, M., "A Virtual Machine Introspection Based Architecture for Intrusion Detection," In Proceedings of the Symposium on Network and Distributed Systems Security (SNDSS), Feb. 2003, pp. 191-206.
"Phrack 62 download," www.phrack.org, 337kb, Jul. 13, 2004, pp. 1-28.
U.S. Appl. No. 11/183,225, filed Jul. 15, 2005, Beck et al.
U.S. Appl. No. 10/997,768, filed Nov. 23, 2004, Beck et al.

(Continued)

*Primary Examiner* — Oscar Louie
(74) *Attorney, Agent, or Firm* — Perkins Coie LLP

(57) ABSTRACT

A method and system in a computing device for performing security related functions as part of a process created to execute a software component that may be unrelated to security is provided. The security system provides security code that performs one or more security related functions. When a process is created to execute the code of a software component, the security system causes the security code to be executed before the execution of the code of the software component. One security related function of the security code may be to cause the operating system to maintain information about the process as long as the process exists. If the operating system later reports that the process no longer exists but the information is still being maintained, then the security system can assume that malware is attempting to hide the process.

17 Claims, 7 Drawing Sheets

OTHER PUBLICATIONS

Wang, Yi-Min and Doug Beck, "How to 'Root' a Rootkit That Supports Root Processes Using Strider Ghostbuster Enterprise Scanner," Microsoft Technical Report MSR-TR-2005-21, Feb. 11, 2005, Microsoft Research, (2 pages).

Wang, Yi Min, Binh Vo, Roussi Roussev, Chad Verbowski and Aaron Johnson, "Strider Ghostbuster: Why it's a Bad Idea for Stealth Software to Hide Files," Jul. 24, 2004, Microsoft Technical Report MSR-TR-2004-71, (15 pages).

Wang, Yi-Min, Doug Beck, Binh Vo, Roussi Roussev and Chad Verbowski, "Detecting Stealth Software with Strider GhostBuster," Microsoft Technical Report MSR-TR-2005-25, publicly released on Feb. 21, 2005, Microsoft Research, (11 pages).

Muttik, Igor, "Stripping Down an AV Engine," Virus Bulletin Conference, Sep. 2000, pp. 59-68.

"Working with the AppInit_DLLs registry value," Microsoft Corporation, Article ID 197571, last review Feb. 19, 2005, revision 4.0, (1 page), http://support.microsoft.com/default.aspx?scid=kb;en-us;197571.

"AppInit_DLLs Registry Value and Windows 95," Microsoft Corporation, Article ID 134655, Copyright Microsoft Corporation, 2005, last review Mar. 1, 2005, revision 3.2, (2 pages), http://support.microsoft.com/kb/134655/.

Schneier, Bruce, "Schneier on Security:—A weblog covering security and security technology: GhostBuster," Feb. 15, 2005, (9 pages), http://www.schneier.com/blog/archives/2005/02/ghostbuster/html.

"How to Use the Windiff.exe Utility," Microsoft Knowlege Base Article—159214, Copyright 2004, Microsoft Corporation (3 pages) http://support.microsoft.com/default.aspx?scid=kb;en-us;159214.

NTQuerySystemInformation, Microsoft, Jul. 2005, (4 pages), http://msdn.microsoft.com/library/en-us/sysinfo/base/ntquerysysteminformation.asp?frame=true.

BIOS Boot Specification, Compaq Computer Corporation, Phoenix Technologies, Ltd., Intel Corporation, Version 1.01, Jan. 11, 1996 (46 pages).

Kodmaker@syshell.org, "NTIllusion: A Portable Win 32 userland rootkit," Phrack Inc., vol. 0x0b, Issue 0x3e, Phile #0x0c of 0x10, Jul. 13, 2004, (28 pages).

Altunergil, Oktay, "Scanning for Rootkits," Linux Devcenter.com, Feb. 7, 2002 (8 pages).

holy_father@phreaker.net, "Invisibility on NT boxes—How to become unseen on Windows NT," Code Breakers Journal, vol. 1, No. 2 (2004), May 8, 2003, (26 pages).

Dittrich, "Root Kits" and Hiding Files/Directories/Processes After a Break-in, Jan. 2002 (12 pages).

Busleiman, Arturo, "Detecting and Understanding Rootkits," Sep. 2003 (13 pages).

Altunergil, Oktay, "Understanding Rootkits," Linux Devcenter.com, Dec. 14, 2001 (13 pages).

Wang, Yi-Min, Roussi Roussev, Chad Verbowski, Aaron Johnson and David Ladd, "AskStrider: What Has Changed on My Machine Lately?," Microsoft Research Technical Report MSR-TR-2004-03, Jan. 5, 2004, (13 pages).

Poulsen, Kevin, "Windows Root Kits a Stealthy Threat," The Register, SecurityFocus Online, Mar. 7, 2003 (3 pages).

Wang, Yi-Min, Binh Vo, Roussi Roussev, Chad Verbowski and Aaron Johnson, "Strider GhostBuster: Why It's a Bad Idea for Stealth Software to Hide Files," Microsoft Research, Redmond, Aug. 2004 (1 page).

* cited by examiner

PERFORMING SECURITY FUNCTIONS WHEN A PROCESS IS CREATED

BACKGROUND

Although the Internet has had great successes in facilitating communications between computer systems and enabling electronic commerce, the computer systems connected to the Internet have been under almost constant attack by hackers seeking to disrupt their operation. Many of the attacks seek to exploit vulnerabilities of the application programs, operating systems, and other computer programs executing on those computer systems. One of the most destructive methods of attacking a computer system has been to modify portions of the operating system either on disk or in memory with software that may perform many of the same functions of the operating system, but also includes malicious functions. These modifications can be either to replace portions of the operating system or to add new programs that are automatically started by the operating system. Such software is referred to as "malware" because of its malicious nature. Once malware is installed on a computer system or host, the operating system is "infected" and the malware can control all aspects of the computer system. Such malware includes rootkits, Trojans, keystroke loggers, and so on. For example, the malware could intercept keystrokes that a user enters (e.g., a password) and report them to another computer system. As another example, the malware could be a worm that launches a self-propagating attack that exploits a vulnerability of a computer system by taking control and using that computer system to find other computer systems with the same vulnerability and launch attacks (i.e., send the same worm) against them.

To prevent detection, malware often uses advanced stealth techniques to make its resources such as executable files, data files (e.g., recorded keystroke files), and processes "invisible" or "hidden." Once malware is started, it may intercept all queries (e.g., system calls) at a very low level (e.g., kernel mode) and use filtering to ensure that a chosen subset of its resources is never revealed to any query operations by any program running on the infected computer system. For example, a keystroke logger may intercept all requests from programs for file listings and delete the name of its log file from the list that is returned to the programs. The keystroke logger may even intercept requests for available disk space and add the size of the log file to the available disk space to make it difficult to detect the presence of the log file. The keystroke logger may also intercept all requests from programs for process related information and remove any information related to the keystroke logger process, task, thread, and so on. These stealth techniques can defeat both experienced system administrators who use common operating system utilities, such as WINDOWS Explorer, a directory list command, a registry editor, a task manger, and so on, to search the file system, configuration files (e.g., registry files), and process tables for suspicious entries, and commonly used malware scanning tools that are based on known malware file signatures.

Many different techniques have been used to help detect the presence of such malware; unfortunately, detection of some malware has proved to be difficult. One technique attempts to identify the presence of malware by the presence of an open port. Malware may install a backdoor so that the computer system can be accessed at a later time. The backdoor opens a port through which another computer system can gain access to the infected computer system. The technique can initiate a port scan from another computer system to detect the presence of an open port. If, however, the malware only opens a port at designated times, then the scanning may not detect the open port. Another technique may compare the files of the infected operating system with files of a non-infected or "clean" operating system. In particular, the technique may generate hash codes for the files of the infected operating system and compare them to hash codes of the clean operating system. However, since the malware may have total control over the computer system, it can provide the clean version, rather than the infected version, of a file to a program that is calculating the hash codes.

Because of the difficulty in detecting malware, some computer users have resorted to reinstalling an operating system onto a storage device that might be infected from a storage device that contains a copy of the operating system that is known (or thought) to be clean. Such reinstalling of an operating system is time-consuming. Moreover, such reinstalling is unnecessary if the operating system was not actually infected—although the user could not be sure that it was not infected.

SUMMARY

A method and system in a computing device for performing security related functions as part of a process created to execute a software component that may be unrelated to security is provided. The security system provides security code that performs one or more security related functions. When a process is created to execute the code of a software component, the security system causes the security code to be executed before the execution of the code of the software component. One security related function of the security code may be to cause the operating system to maintain information about the process as long as the process exists. If the operating system later reports that the process no longer exists but the information is still being maintained, then the security system can assume that malware is attempting to hide the process. Another security related function of the security code may be to determine whether the software component to be executed is itself malware. Another security related function of the security code may be to monitor other security components of the computing device to determine whether they have been compromised.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
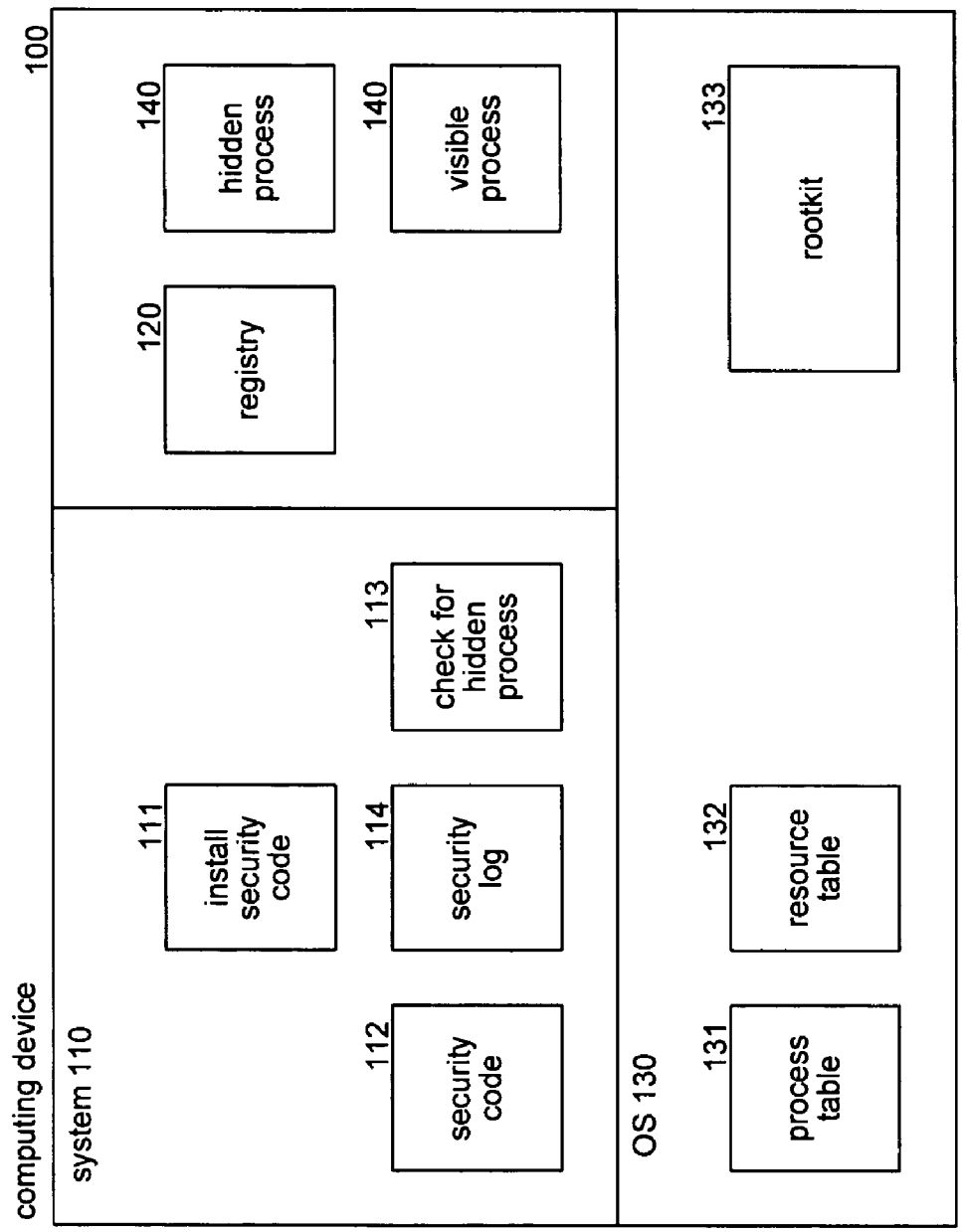
FIG. 1 is a block diagram that illustrates a computing device on which an embodiment of the security system has been installed.

A method and system in a computing device for detecting security problems as part of a process created to execute a software component that may be unrelated to security is provided. In one embodiment, the security system provides security code that performs one or more security related functions. When a process is created to execute the code of a software component, the security system causes the security code to be executed before the execution of the code of the software component. The security system may configure the computing device so that whenever a process is created, the security code is executed before the execution of the code of the software component of that process. For example, the security system may set an application initial dynamic link library field to point to the security code so that it is automatically loaded and executed as the first code of every newly created process. One security related function of the security code may be to cause the operating system to maintain information about the process so long as the process exists. If the operating system later reports that the process no longer exists but the information is still being maintained, then the security system can assume that malware is attempting to hide the process. Another security related function of the security code may be to determine whether the software component to be executed is itself malware. If the security code determines that the software component is malware, then the security code can terminate the process. Another security related function of the security code may be to act as a watchdog of other security components of the computing device. For example, the security code may check whether anti-virus software is executing on the computing device. If not, the security code may restart the anti-virus software. The security code may implement any combination of these and other security functions. In this way, the security system can perform security related functions with newly created processes before the code of the software component for which the process is created executes. Moreover, because the security code may be executed as part of every process on a computing device, it can provide an effective mechanism for providing security related functions.

In one embodiment, the security system provides security code that records an indication that a process has been created and causes information to be maintained as long as the process exists. For example, the security code may add an entry to a security log containing an identifier of the software component for which the process has been created and an identifier of the process. The security code may cause the information to be maintained by performing an action that causes the operating system to maintain the information so long as the process exists but no longer (e.g., "non-persistent"). For example, the security code may open a file, which may cause the operating system to maintain a handle for the file throughout the lifetime of the process. As another example, the security code may also create a child process so that the operating system will maintain information about the child process. As another example, the security code may also allocate a resource (e.g., semaphore) for which the operating system will maintain a handle. If the software component does not know about the information that is maintained, it cannot cause the operating system to stop maintaining the information unless it terminates the process. At a later time, the security system may check whether each of the processes recorded in the security log still exists. The security system may request the operating system to provide a list of the identifiers of the existing processes. If a process identified in the security log is not included in the list of existing processes, then the process may possibly be hidden (e.g., by itself or some other malware). Some malware on the computing device may have filtered the list of executing processes to remove the identifier of the process. For each process that is possibly hidden, the security system checks the operating system to determine whether the information that is maintained while the process exists still exists. For example, the security system may determine whether the handle to the file opened by the security code is still maintained by the operating system. If so, then the security system may assume that the software component is malware or that some other malware is attempting to hide that process. In this way, by causing information to be maintained only while a process exists, the security system can determine whether malware is attempting to hide a process.

In one embodiment, the security system provides security code that determines whether the software component for which a process is created contains malware. The security code, when it is executing within the process created for the software component, may analyze the code or other information of the software component to determine whether the software component may contain malware. For example, the security code may generate a hash code of part of or all of the software component and compare it to the hash code of known malware. Alternatively, the security code may check attributes of the software component such as filename and creator to determine whether the software component may contain malware. Once the security code determines that the software component may contain malware, the security code can record an indication that malware was detected so that it can later be removed. Alternatively, the security code may terminate the process so that the malware of the software component is not executed. In this way, the security system can identify and prevent the execution of known malware.

In one embodiment, the security code may perform watchdog or monitoring functions to determine whether certain security related components of the computing device have been compromised. For example, anti-virus software may execute in a process and have an expected hash code. The security code may ensure that the process exists and that its hash code matches the expected hash code. If not, the security code may assume that the anti-virus software has been compromised. As another example, the security code may check the hash code on certain portions of the operating system. If a security related component has been compromised, then the security code may take appropriate action. For example, the security code may attempt to restore the security related components to an uncompromised state such as by terminating an existing process and restarting the process, restarting a previously terminated process, resetting configuration information, restoring system resources, and so on. When the security code is executed by a process created during initialization of the computing device, it can check configuration information to determine whether it has been compromised. If so, the security code can reset the configuration information to help ensure that the computing device is initialized correctly. For example, the first process of MICROSOFT WINDOWS creates system services identified by configuration information. The security code can ensure that the configuration information does not identify any system services that contain malware. The security code may also record that a security related component has been compromised so that it can alternatively or in addition be addressed later (e.g., by a system administrator).

In one embodiment, the security system may need to set configuration information of the computing device so that the security code will be executed as part of every process or just certain processes. As described above, the security system may set a global application initial dynamic link library field to point to the security code. For example, the security system may set the AppInit_DLLs registry entry of WINDOWS to point to a dynamic link library containing the security code. Whenever a process is created, the operating system will cause the security code to be executed first. Because malware may already be attempting to hide a process on the computing device, the computing device may need to be re-initialized (e.g., re-booted) so that the security code can be fully effective (e.g., the security code can log each process before it is hidden). Some security related functions, however, can be effective without requiring re-initialization of the computing device. For example, security code that serves as a watchdog for security related components may be effective without re-booting the system.

The computing device on which the security system is implemented may include a central processing unit, memory, input devices (e.g., keyboard and pointing devices), output devices (e.g., display devices), and storage devices (e.g., disk drives). The memory and storage devices are computer-readable media that may contain instructions that implement the security system. In addition, the data structures and message structures may be stored or transmitted via a data transmission medium, such as a signal on a communications link. Various communications links may be used, such as the Internet, a local area network, a wide area network, or a point-to-point dial-up connection.

The security system may be implemented in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. The security system may be implemented on computing devices that include personal digital assistants ("PDAs"), cell phones, consumer electronic devices (e.g., audio playback devices), game devices, and so on.

The security system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

FIG. 1 is a block diagram that illustrates a computing device on which an embodiment of the security system has been installed. The computing device 100 includes a security system 110, a registry 120, an operating system 130, and processes 140. The security system includes an install security code component 111, a security code component 112, a check for hidden process component 113, and a security log 114. The install security code component may set the AppInit_DLLs entry of the registry to point to the security code. The install security code component may then cause the computing device to reboot in case the computing device already has a hidden process. Other techniques may be used for causing the security code to be executed as part of processes. For example, the computing device may be initialized in a debugging mode which causes "debugging" code to be executed as part of every process. The security system may specify that the debugging code is the security code. Alternatively, the security system may add an entry to a dynamic link library table of a component to allow the security code to be executed as the first dynamic link library of that software component. The security code component performs any of the various security related functions. The security code component may add an entry to the security log for each process that is created and cause the operating system to maintain a handle to a resource. The check for hidden process component may request the operating system for a list of identifiers of existing processes and compare the list to the security log to determine whether a process is attempting to hide. In particular, if a process identified in the security log is not in the list, but the operating system has a handle to a resource of that process, then the component determines that the process is hiding. The operating system may include a process table 131, a resource table 132, and an infecting rootkit 133. The process table may contain an entry for each existing process. When the operating system is requested to provide a list of existing processes, it accesses the process table. The rootkit, however, intercepts the list and removes those processes from the list that it wants to hide. The resource table may contain a handle for resources allocated to existing processes.

Figure 2:
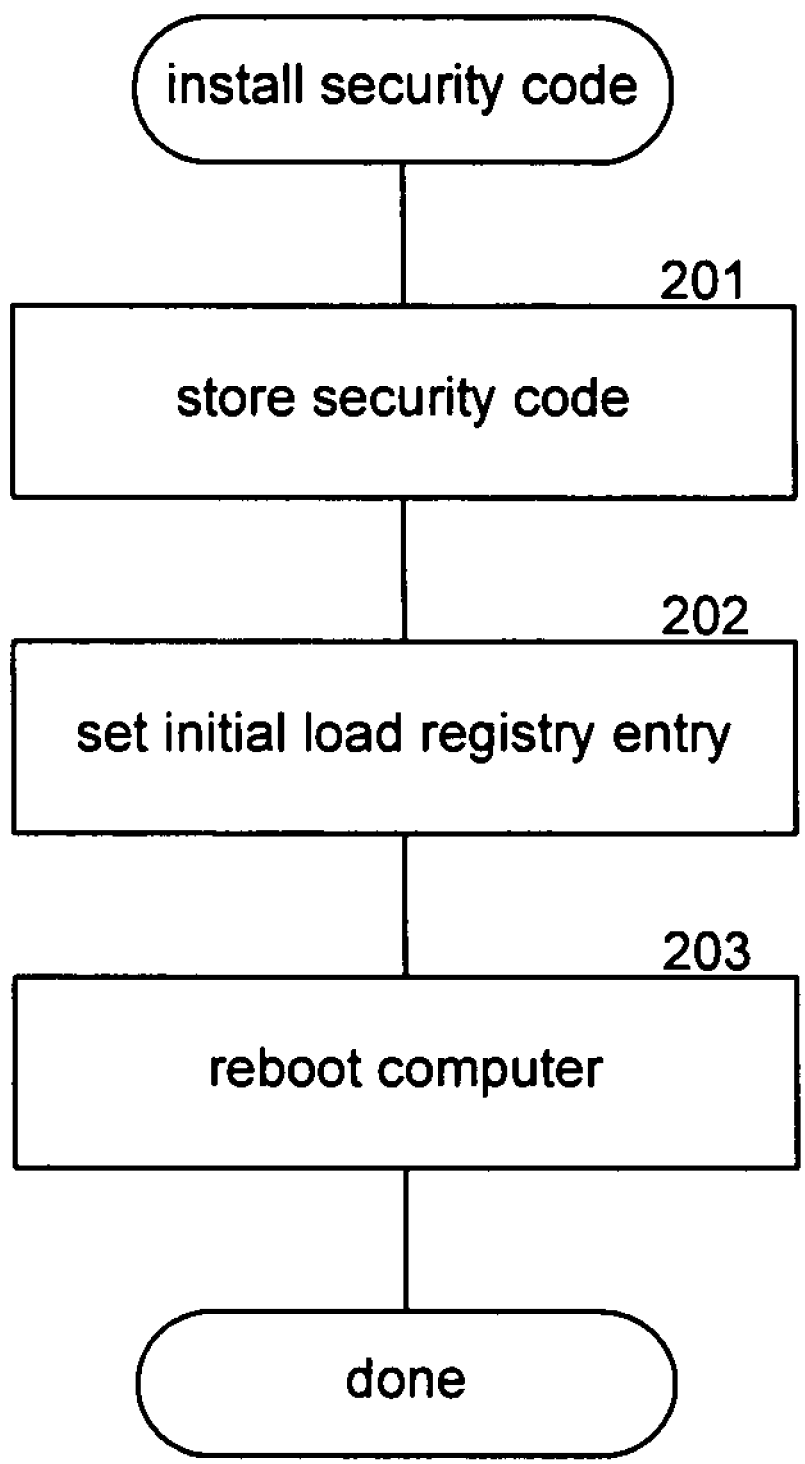
FIG. 2 is a flow diagram that illustrates the processing of the install security code component in one embodiment.

FIG. 2 is a flow diagram that illustrates the processing of the install security code component in one embodiment. In block 201, the component stores the security code onto the computing device. For example, the component may store a copy of the security code on a secondary storage device of the computing device. In block 202, the component may set a registry entry to point to the stored security code that is to be loaded and executed as part of every newly created process. In block 203, the component causes the computing device to reboot and then completes.

Figure 3:
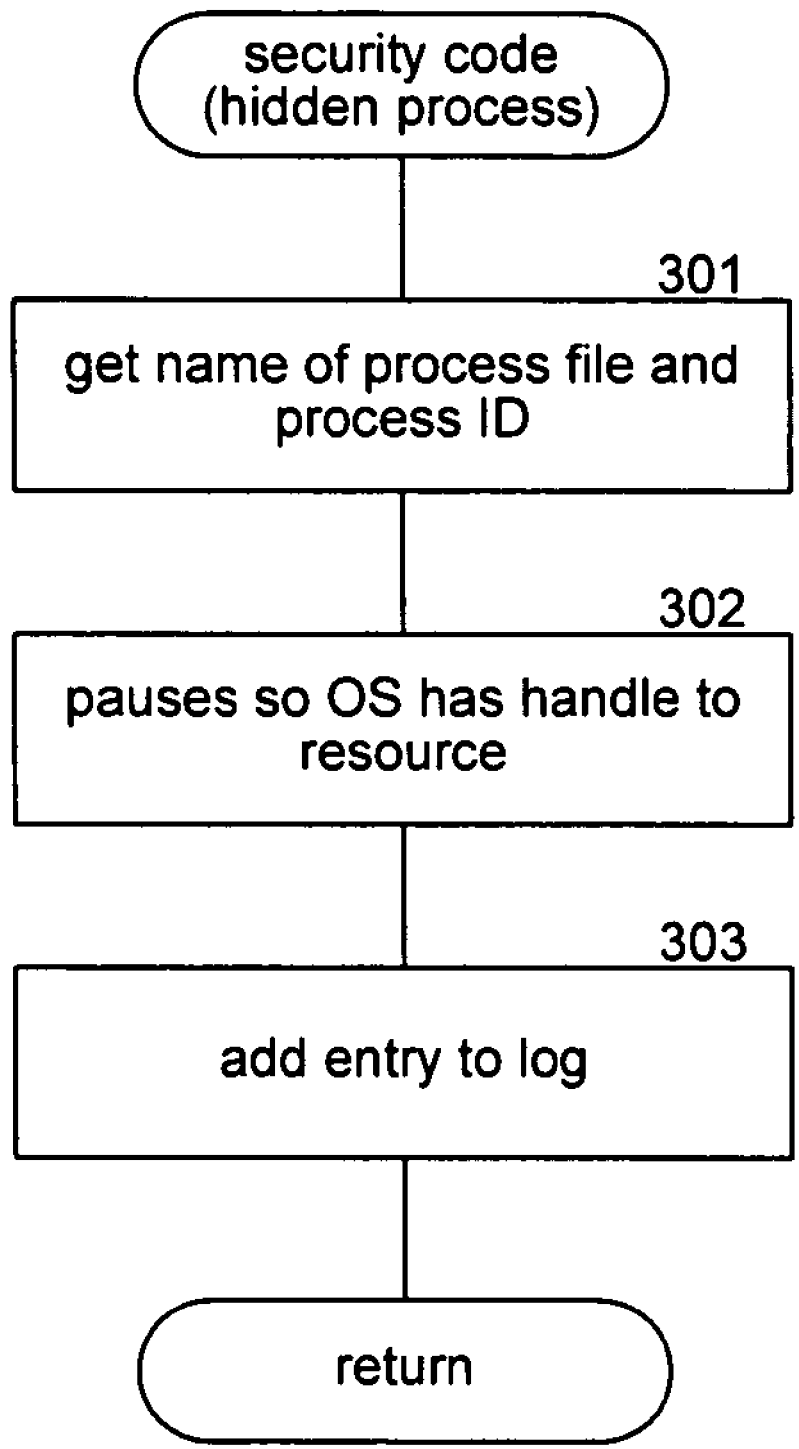
FIG. 3 is a flow diagram that illustrates the processing of the security code component for detecting a hidden process in one embodiment.

FIG. 3 is a flow diagram that illustrates the processing of the security code component for detecting a hidden process in one embodiment. The component may be executed as the first code of a newly created process. The component records information so that an attempt to hide a process can be detected later. In block 301, the component retrieves the name on the file that contains the software component to be executed. The component may also retrieve a process identifier of the newly created process. In block 302, the component causes the operating system to maintain a handle to a system resource only as long as the newly created process exists. For example, the component may create a file so that the operating system maintains a handle to that file until the process terminates. In block 303, the component adds an entry to the security log that identifies the software component to execute in the process. The component then returns so that the code of the software component for which the process was created can execute.

Figure 4:
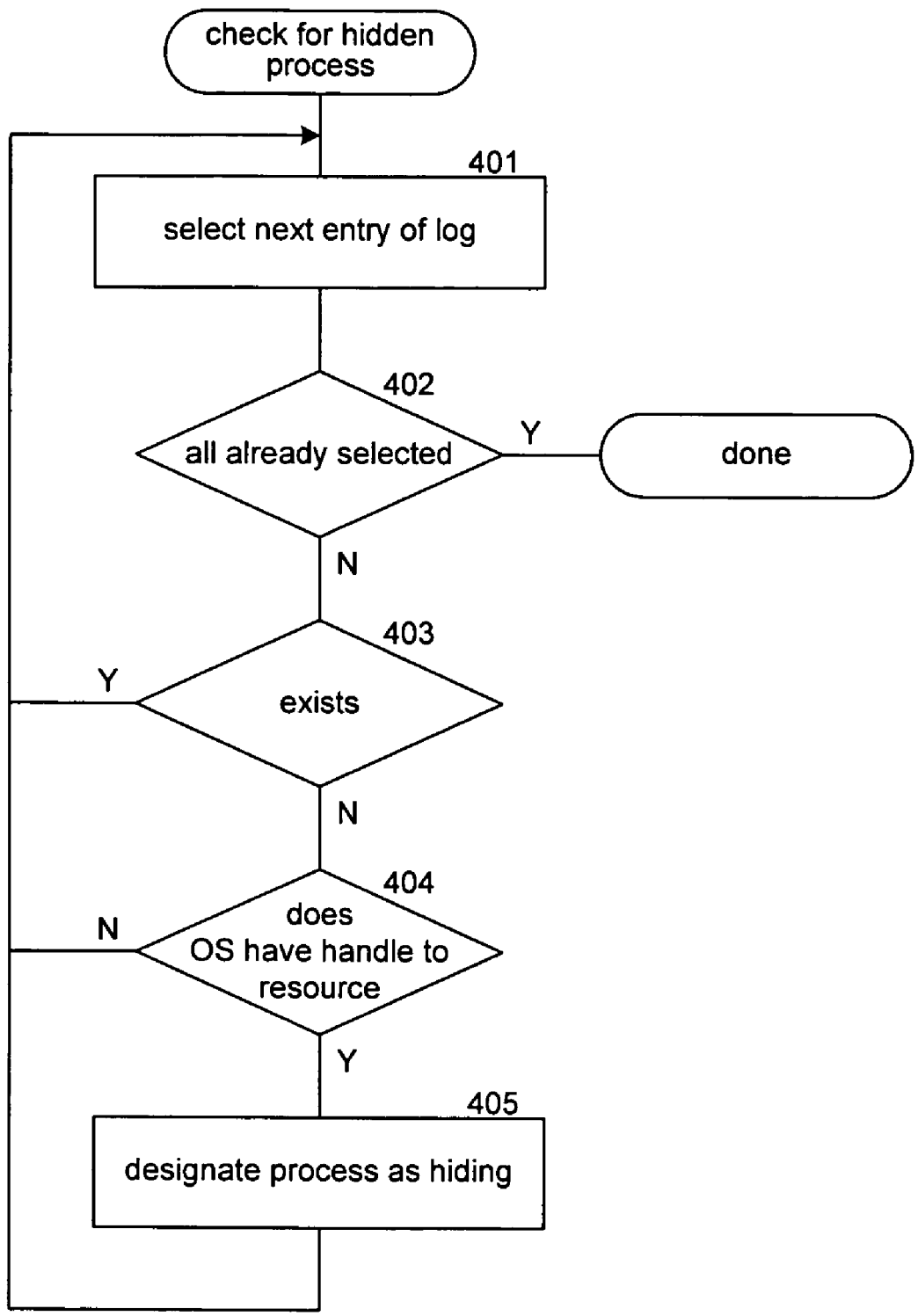
FIG. 4 is a flow diagram that illustrates the processing of the check for hidden process component of the security system in one embodiment.

FIG. 4 is a flow diagram that illustrates the processing of the check for hidden process component of the security system in one embodiment. The component is invoked to determine whether a process is currently attempting to hide. In blocks 401-405, the component loops processing each entry of the security log. In block 401, the component selects the next entry of the security log. In decision block 402, if all the entries in the security log have already been selected, then the component completes, else the component continues at block 403. In decision block 403, if the process of the selected entry currently exists as reported by the operating system, then the component loops to block 401 to select the next entry, else the component continues in block 404. In decision block 404, if the operating system has a handle to a resource associated with the process of the selected entry, then the component continues at block 405, else the process does not exist and the component loops to block 401 to select the next entry. In block 405, the component designates the process of the selected entry as attempting to hide and then loops to block 401 to select the next entry.

Figure 5:
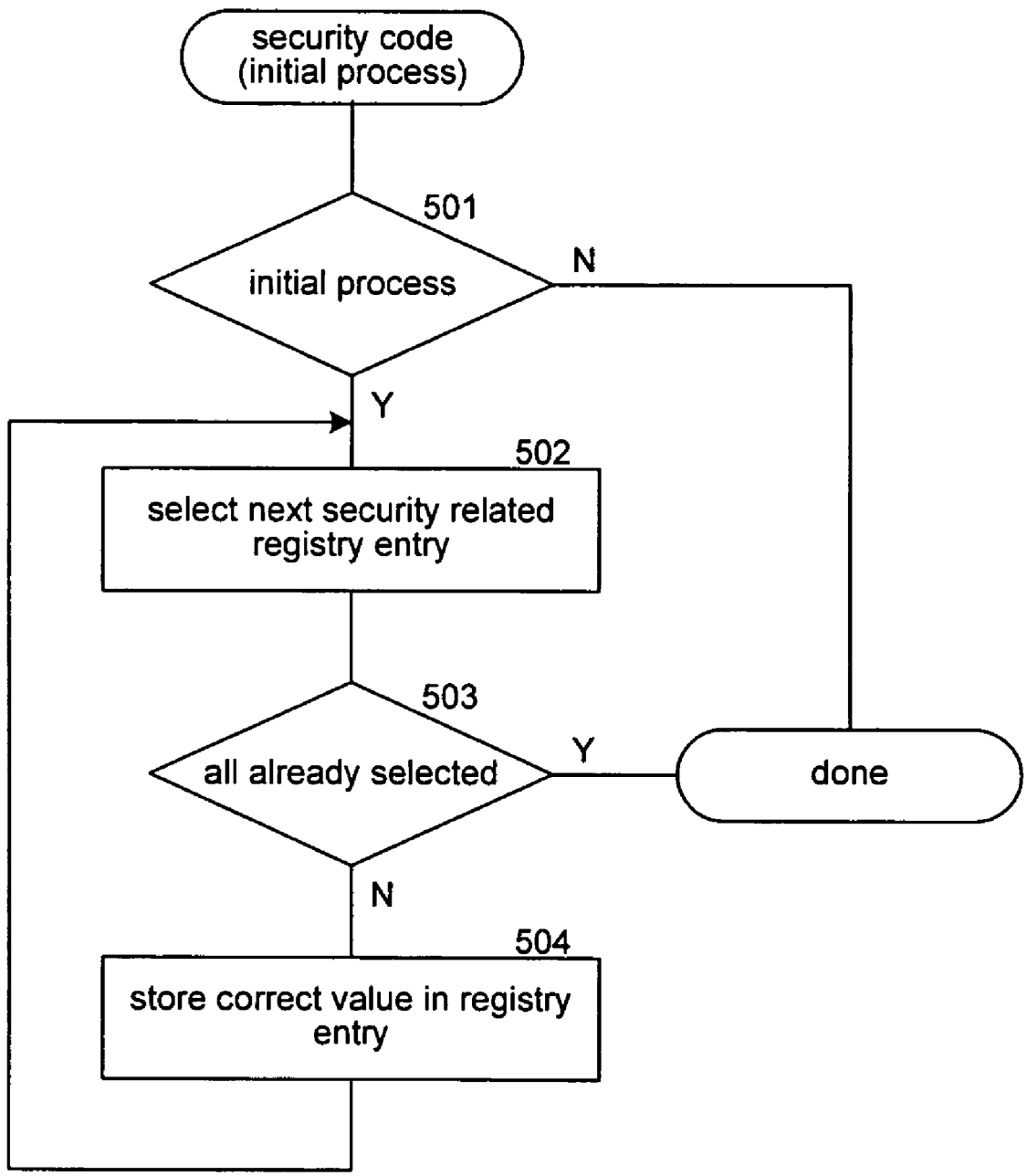
FIG. 5 is a flow diagram that illustrates the processing of a security code component for verifying configuration information of an operating system at initialization in one embodiment.

FIG. 5 is a flow diagram that illustrates the processing of a security code component for verifying configuration information of an operating system at initialization in one embodiment. The security code component may be executed as part of every process but may perform different security related functions depending on the software component to be executed as part of the process. For example, the component may perform certain functions only if the process has been created for a software component that is the first software component to be executed after system initialization. In such a case, the security code component can correct any incorrect configuration information so the computing device is configured correctly. In decision block 501, if the process is the initial process to be created during system initialization, then the component continues at block 502, else the component completes. In blocks 502-504, the component loops ensuring that certain configuration information is correct. In this embodiment, the component is ensuring that the values for certain security related registry entries are correct. In block 502, the component selects the next security related registry entry. In decision block 503, if all the security related registry entries have already been selected, then the component completes, else the component continues at block 504. In block 504, the component stores a correct value in the selected registry entry and then loops to block 502 to select the next security related registry entry.

Figure 6:
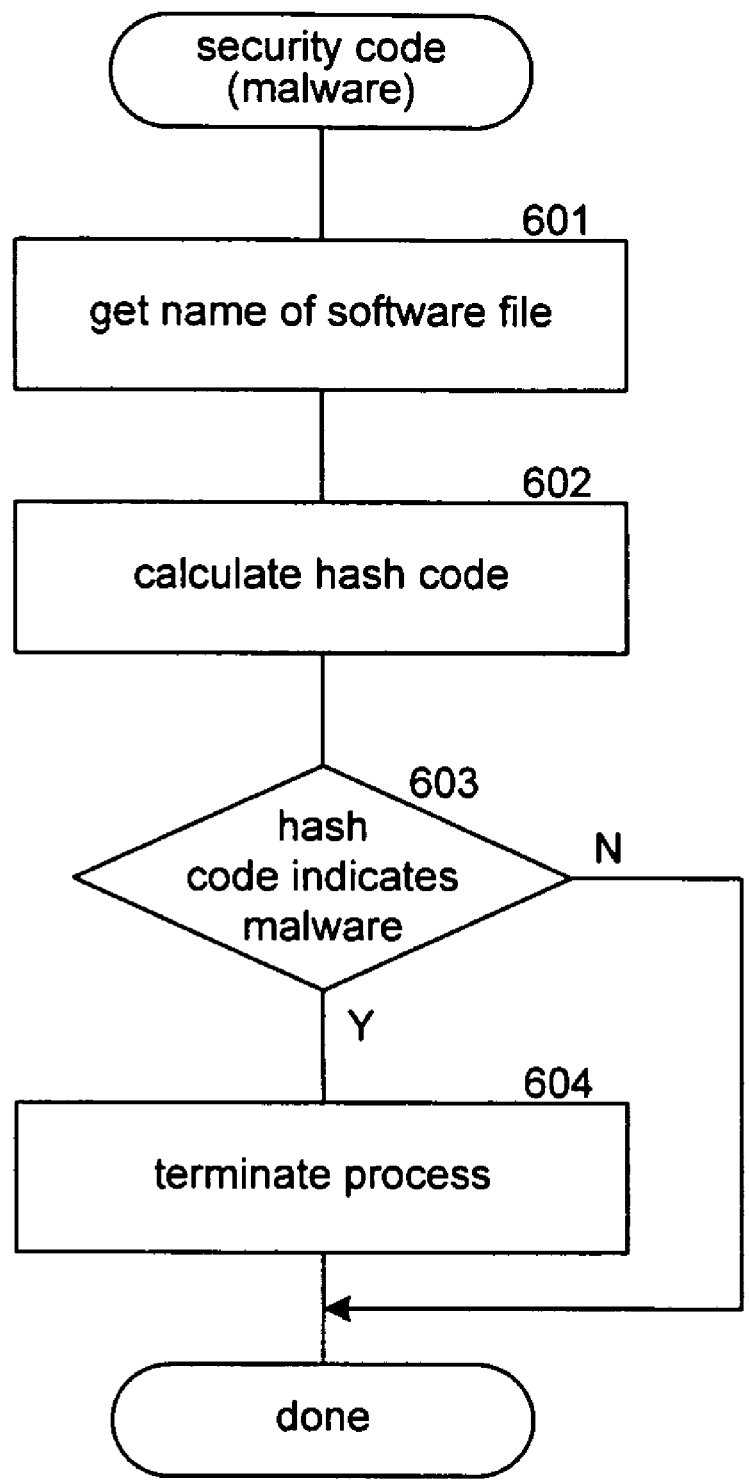
FIG. 6 is a flow diagram that illustrates the processing of the security code component for directly detecting whether the software component contains known malware in one embodiment.

FIG. 6 is a flow diagram that illustrates the processing of the security code component for directly detecting whether the software component contains known malware in one embodiment. The component determines whether the software component for which a process is created contains malware and, if so, terminates the process. In block 601, the component retrieves the name of the file that contains the software component. In block 602, the component calculates a hash code for the software component. In decision block 603, if the hash code indicates malware (or the file name indicates malware), then the component continues at block 604, else the component completes. In block 604, the component terminates the process and then completes.

Figure 7:
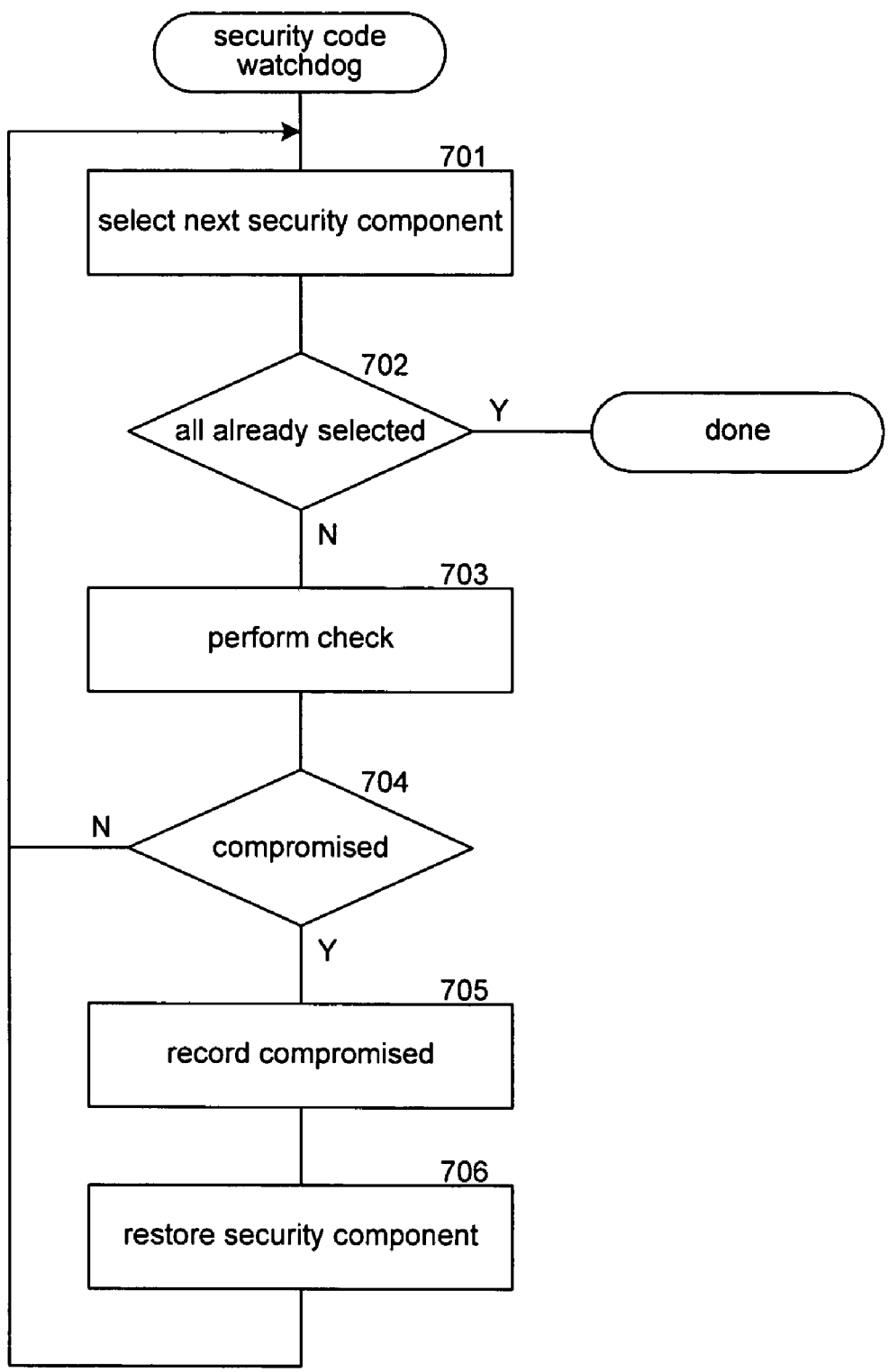
FIG. 7 is a flow diagram that illustrates the processing of the security code component to monitor security related components in one embodiment.

FIG. 7 is a flow diagram that illustrates the processing of the security code component to monitor security related components in one embodiment. The component monitors security related components of the computing device to determine whether they have been compromised. In blocks 701-706, the component loops checking each security related component. In block 701, the component selects the next security related component to be monitored. In decision block 702, if all the security related components have already been selected, then the component completes, else the component continues at block 703. In block 703, the component performs a check to determine whether the selected security related component has been compromised. In decision block 704, if the selected security related component has been compromised, then the component continues at block 705, else the component loops to block 701 to select the next security related component. In block 705, the component records that the selected security related component has been compromised. In block 706, the component restores the security component to an uncompromised state and then loops to block 701 to select the next security related component.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

From the foregoing, it will be appreciated that specific embodiments of the security system have been described herein for purposes of illustration, but that various modifications may be made without deviating from the spirit and scope of the invention. Accordingly, the invention is not limited except as by the appended claims.

We claim:

1. A method in a computing device of performing a security related function, the method comprising:
   providing security code that performs a security related function;
   providing a plurality of software components that include code, each software component for executing within a process;
   setting a configuration to cause the security code to execute within a first process before a first software component executes within the first process;
   creating by an operating system executing in kernel mode the first process for executing the first software component of the plurality of software components, the operating system storing an indication of existence of the first process;
   after the first process is created for executing the first software component of the plurality of software components,
      executing by the computing device the provided security code within the first process before the code of the first software component is executed in accordance with the set configuration so the security related function can be performed before the code of the first software component is executed within the first process, the security related function to support detecting whether the first software component contains malware, wherein the security code records an identifier of the first software component of the first process and performs an action so that the operating system maintains certain information relating to the action only while the first process exists; and
      after executing the provided security code within the first process, starting execution of the first software component within the first process;
   after executing the provided security code, executing code of a security system outside of the first process and the operating system, that
      requests the operating system for a report of existing processes;
      determines whether the first process is in the report of existing processes; and
      upon determining that the first process is not in the report of existing processes,
         determines whether the certain information is still maintained by the operating system, the certain information relating to the action performed by the security code within the first process before the code of the first software component was executed; and
         upon determining that the certain information is still maintained by the operating system, indicating that the first software component contains malware.

2. The method of claim 1 wherein the certain information is a handle to a resource.

3. The method of claim 2 wherein the resource is a file.

4. The method of claim 1 wherein the security code is in a dynamic link library and the set configuration indicates to load and execute that dynamic link library before any code of the first software component.

5. The method of claim 1 wherein the security system terminates the first process when it is determined that the first software component contains malware.

6. The method of claim 1 wherein the security code checks whether certain security related components of the computing device are in a correct state.

7. The method of claim 6 wherein one of the security related components is anti-virus software.

8. The method of claim 6 wherein one of the security related components enforces a security policy.

9. The method of claim 1 wherein the security code that executes within the first process additionally analyzes code of the first software component to determine whether the first software component is malware and terminates the first process upon determining that the first software component is malware.

10. The method of claim 9 wherein the security code generates a hash code of the code of the software component and determines that the software component is malware when the generated hash code matches the hash code of known malware.

11. The method of claim 9 wherein the security code determines that the software component is malware when the file name of the software component matches the file name of known malware.

12. A computer-readable memory device configured to control a computing device to detect whether a process managed by an operating system is hidden, by a method comprising:
   setting a configuration to cause security code to execute within the process before a software component executes within the process;
   after the process is created for execution of the software component within the process and before executing code of the software component within the process as indicated by the set configuration, executing code within the process that performs an action that causes the operating system of the computing device to maintain certain information while the process exists;
   after executing the code within the process that causes the operating system to maintain certain information while the process exists, starting execution of the software component within the process; and
   after starting execution of the software component within the process, executing a security system outside of the process and the operating system, the security system for:
      requesting the operating system for a list of existing processes;
      determining whether the process is within the list of existing processes; and
      after determining that the process is not within the list of existing processes,
         determining whether the certain information is still maintained by the operating system, the certain information maintained by the operating system as a result of the action performed by the code executing within the process before executing the code of the software component within the process; and
         upon determining that the certain information is still maintained by the operating system, indicating that the process is hidden.

13. The computer-readable memory device of claim 12 wherein the certain information is a handle to a resource.

14. The computer-readable memory device of claim 13 wherein the resource is a file.

15. The computer-readable memory device of claim 12 wherein the computing device contains malware that causes the operating system to report that the process no longer exists when the process does exist.

16. A computing device configured to perform a security related function for the computing device, comprising:
   a memory storing computer-executable instructions of:
      software components;
      a component that sets a configuration to cause security code to execute within a process before a software component executes within the process;
      a component that, after the process is created by an operating system for executing the software component, automatically executes security code within the process before executing code of the software component as indicated by the set configuration wherein the security code performs the security related function so that the operating system maintains information relating to the process while the process exists for detecting whether the software component contains malware; and
      a component of a security system that executes outside of the process and the operating system to determine whether the information, that is maintained by the operating system as a result of the security code performing the security related function within the process before executing code of the software component within the process, is still maintained by the operating system but the operating system reports that the process does not exist and upon such a determination, reporting the software component contains malware; and
   a processor for executing the computer-executable instructions stored in the memory.

17. The computing device of claim 16 wherein the automatically executed code checks whether certain software components of the computing device are in a correct state.

* * * * *